United States Patent
Lenneman et al.

(10) Patent No.: US 10,384,600 B1
(45) Date of Patent: Aug. 20, 2019

(54) AUTONOMOUS VEHICLE PASSENGER IDENTIFICATION AND GUIDANCE SYSTEM

(71) Applicant: GM Global Technology Operations LLC, Detroit, MI (US)

(72) Inventors: Joseph V. Lenneman, Royal Oak, MI (US); Yael Shmueli Friedland, Tel Aviv (IL); Michael A. Gutierrez, Dearborn Heights, MI (US); Jeffrey L. Konchan, Romeo, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/882,164

(22) Filed: Jan. 29, 2018

(51) Int. Cl.
| | |
|---|---|
| G08B 21/00 | (2006.01) |
| B60Q 9/00 | (2006.01) |
| B60W 50/16 | (2012.01) |
| B60W 50/00 | (2006.01) |
| G05D 1/00 | (2006.01) |
| E05B 39/00 | (2006.01) |
| B60W 50/14 | (2012.01) |

(52) U.S. Cl.
CPC ........... *B60Q 9/00* (2013.01); *B60W 50/0098* (2013.01); *B60W 50/16* (2013.01); *E05B 39/007* (2013.01); *G05D 1/0088* (2013.01); *B60W 2050/143* (2013.01); *E05Y 2400/86* (2013.01); *E05Y 2900/531* (2013.01)

(58) Field of Classification Search
CPC ........ B60Q 9/00; H04W 4/40; B60W 30/181; G05D 1/0088; G06Q 50/30
USPC .......................................... 340/463
See application file for complete search history.

(56) References Cited

U.S. PATENT DOCUMENTS

| | | | | |
|---|---|---|---|---|
| 9,194,168 | B1* | 11/2015 | Lu | E05F 15/70 |
| 2015/0109116 | A1* | 4/2015 | Grimm | B60R 25/1001 |
| | | | | 340/426.18 |
| 2015/0175072 | A1* | 6/2015 | Sabeti | H04N 7/183 |
| | | | | 348/148 |
| 2015/0338849 | A1* | 11/2015 | Nemec | G05D 1/0055 |
| | | | | 701/25 |
| 2017/0120804 | A1* | 5/2017 | Kentley | G05D 1/0088 |
| 2017/0240110 | A1* | 8/2017 | Lopez-Hinojosa | H04W 76/10 |

OTHER PUBLICATIONS

U.S. Appl. No. 15/606,410, filed May 26, 2017, Kamhi et al.
U.S. Appl. No. 15/620,401, filed Jun. 12, 2017, Shmueli Friedland et al.

* cited by examiner

*Primary Examiner* — Mark S Rushing (57) ABSTRACT

A system to provide alerts to guide visually-impaired passengers to a vehicle is disclosed. The system includes a passenger identification module that is configured to identify a passenger based upon sensor data received at an autonomous vehicle and a passenger proximity module that is configured to determine a distance between the passenger and the autonomous vehicle. The system also includes an alert module that is configured to generate an alert having an alert characteristic corresponding to the distance.

20 Claims, 4 Drawing Sheets

AUTONOMOUS VEHICLE PASSENGER IDENTIFICATION AND GUIDANCE SYSTEM

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to autonomous driving vehicles, and more particularly to autonomous driving vehicles including a passenger management system that provides alerts to guide visually-impaired passengers to the vehicle and/or vehicle doors.

An autonomous vehicle is a vehicle that is capable of sensing a surrounding environment and navigating with little or no user input. An autonomous vehicle senses the surrounding environment using sensors such a radar, LIDAR, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

SUMMARY

In an example, a system to provide alerts to guide visually-impaired passengers to a vehicle is disclosed. The system includes a passenger identification module that is configured to identify a passenger based upon sensor data received at an autonomous vehicle and a passenger proximity module that is configured to determine a distance between the passenger and the autonomous vehicle. The system also includes an alert module that is configured to generate an alert having an alert characteristic corresponding to the distance.

In other features, the system includes a passenger guidance module that is configured to determine whether the distance is greater than a predetermined distance threshold and selects the alert characteristic when the distance is greater than the predetermined distance threshold and selects another alert characteristic when the distance is less than the predetermined distance threshold.

In other features, the system also includes a plurality of sensors configured to generate sensor data indicative of an environment surrounding the autonomous vehicle.

In other features, the plurality of sensors include at least one of a radar device, a light detection and ranging (LIDAR) device, an optical camera, a thermal camera, an ultrasonic sensor, a pressure sensor, an ultra-wide band (UWB) sensor, or a global positioning system (GPS) receiver.

In other features, the alert module is configured to transmit the alert to a mobile electronic device associated with the passenger.

In other features, the mobile electronic device generates at least one of a haptic feedback or an audible alert based upon the alert.

In other features, the alert module is configured to generate the alert at a vehicle handle device of the autonomous vehicle.

In other features, the vehicle handle device generates at least one of a haptic feedback or an audible alert based upon the alert.

In other features, the alert module is configured to generate the alert at the vehicle handle device based upon an occupancy of the autonomous vehicle.

In other features, the system includes a door management module that is configured to unlock a door handle when the distance is less than a predetermined distance threshold.

In an example, a method to provide alerts to guide visually-impaired passengers to a vehicle is disclosed. The method includes identifying a passenger based upon sensor data received at an autonomous vehicle and determining a distance between the passenger and the autonomous vehicle. The method also includes generating an alert having an alert characteristic corresponding to the distance.

In other features, the method includes determining whether the distance is greater than a predetermined distance threshold and selecting the alert characteristic when the distance is greater than the predetermined distance threshold and selecting another alert characteristic when the distance is less than the predetermined distance threshold.

In other features, the method includes receiving the sensor data from a plurality of sensors configured to generate sensor data indicative of an environment surrounding the autonomous vehicle.

In other features, the plurality of sensors comprise at least one of a radar device, a light detection and ranging (LIDAR) device, an optical camera, a thermal camera, an ultrasonic sensor, a pressure sensor, an ultra-wide band (UWB) sensor, or a global positioning system (GPS) receiver.

In other features, the method includes transmitting the alert to a mobile electronic device associated with the passenger.

In other features, the mobile electronic device generates at least one of a haptic feedback or an audible alert based upon the alert.

In other features, the method includes generating the alert at a vehicle handle device of the autonomous vehicle.

In other features, the vehicle handle device generates at least one of a haptic feedback or an audible alert based upon the alert.

In other features, the method includes generating the alert at the vehicle handle device based upon an occupancy of the autonomous vehicle.

In other features, the alert characteristic comprises at least one of a frequency characteristic, a pulse duration characteristic, a pulse separation characteristic, or an audible command.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Autonomous driving vehicles can be used to transport passengers, such as in ridesharing environments, to desired locations. However, passengers that have disabilities, such as visually-impaired passengers, may experience difficultly in identifying and locating autonomous driving vehicles without additional assistance.

The present disclosure is directed to a vehicle, such as an autonomous driving vehicle, that includes a passenger management system. The passenger management system identifies passengers to be picked up and that provides alerts to guide the passenger to the vehicle. The alerts can be transmitted to a mobile electronic device of the passenger and/or vehicle door handle devices. The mobile electronic device and/or vehicle door handle device(s) provides haptic feedback and/or audible alerts at varying frequencies, pulse durations, pulse separations based upon the distance between the passenger and the vehicle. Additionally, the passenger management system can generate an alert at one or more door handles to indicate which door to enter based upon occupancy of the vehicle or proximity of the passenger with respect to the vehicle door.

Figure 1:
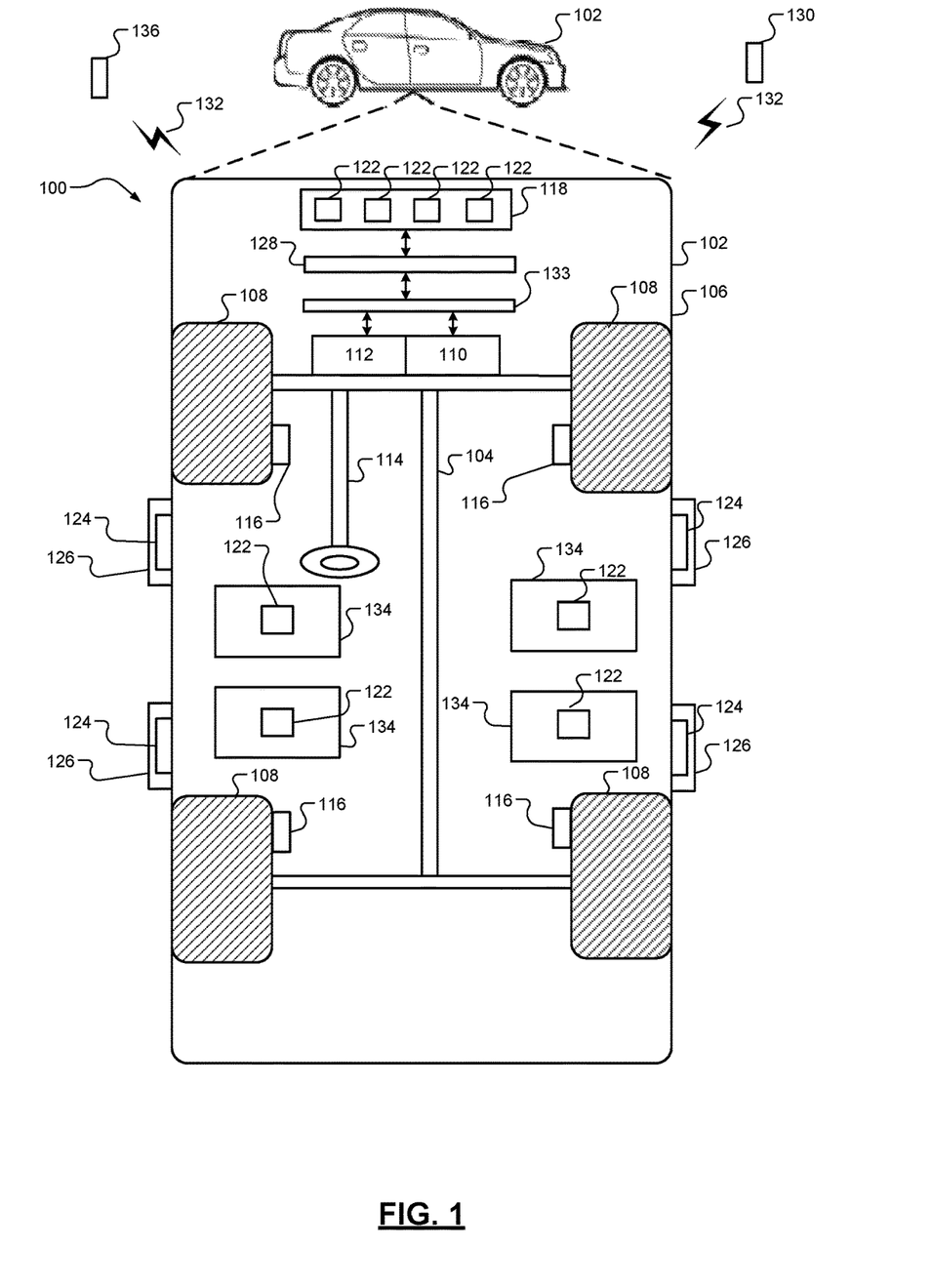
FIG. 1 is a diagrammatic illustration of a vehicle in accordance with an example implementation of the present disclosure.

FIG. 1 illustrates an example passenger management system 100 implemented within a vehicle 102. The passenger management system 100 determines that a passenger is approaching the vehicle 102 and alerts the approaching passenger to the vicinity of the vehicle 102 to provide additional assistance for locating the vehicle 102 relative to the passenger.

The vehicle 102 includes a chassis 104, a body 106, and vehicle wheels 108. The body 106 is arranged on the chassis 104 and encloses components of the vehicle 102. The vehicle wheels 108 are each connected to the chassis 104. In various embodiments, the vehicle 102 is an autonomous vehicle. The vehicle 102 is, for example, a vehicle that is automatically controlled to carry passengers from one location to another. The vehicle 102 is depicted as a passenger car, but it should be appreciated that any other vehicle including trucks, sport utility vehicles (SUVs), and recreational vehicles (RVs) can also be used.

As shown, the vehicle 102 includes a propulsion system 110, a transmission system 112, a steering system 114, a brake system 116, a sensor system 118, and an actuator system 120. In implementations, the propulsion system 110 may include an internal combustion engine, an electric machine such as a traction motor, and/or a fuel cell propulsion system. The transmission system 112 is configured to transmit power from the propulsion system 110 to the vehicle wheels 108. According to various embodiments, the transmission system 112 may include a step-ratio automatic transmission, a continuously-variable transmission, or another type of transmission. The brake system 116 is configured to provide braking torque to the vehicle wheels 108. The brake system 116 may, in various embodiments, include friction brakes, brake by wire, a regenerative braking system such as an electric machine, and/or other appropriate braking systems. The steering system 114 positions the vehicle wheels 108. While depicted as including a steering wheel for illustrative purposes, the steering system 114 may not include a steering wheel.

The sensor system 118 includes one or more sensors 122 that sense the external environment and/or the internal environment of the vehicle 100. The sensors 122 can include, but are not limited to, radars, LIDARs, optical cameras, thermal cameras, ultrasonic sensors, pressure sensors, ultra-wide band (UWB) sensors a global positioning system (GPS) receiver, or other suitable wireless-based unique identifiers. The actuator system 120 includes one or more actuator devices that control one or more vehicle features such as, but not limited to, the propulsion system 110, the transmission system 112, the steering system 114, and the brake system 116.

The vehicle 102 also includes a door handle device 124 located proximate to each door handle 126 of the vehicle 102. The door handle device 124 can include, but is not limited to, a device that provides a proximity alert to a passenger indicating a location of the door handle 126. For example, the door handle device 124 can include a vibration device, an audible device, or the like that alerts a visually impaired passenger to the position of the door handle 126.

As shown in FIG. 1, the vehicle 102 includes a passenger management module 128. The passenger management module 128 communicates with an engine control module 133, the sensor system 118, and/or mobile electronic device 130 via a communication network 132. The passenger management module 128 can use the input to determine a relative position of the passenger with respect to the vehicle 102 and generates an alert having an alert characteristic that corresponds to the distance between the passenger and the vehicle 102. The passenger may use the alert to determine a relative vicinity of the vehicle 102.

The passenger management module 128 transmits the alert to the mobile electronic device 130 and/or to the door handle device 124. The mobile electronic device 130 and/or the door handle device 124 generates feedback based upon the alert. For example, the mobile electronic device 130 can generate haptic feedback and/or audio feedback according to the alert characteristic that is indicative of the distance between the passenger and the vehicle 102. The alert characteristic can include, but is not limited to, a frequency, a pulse duration, a pulse separation, or the like. The engine control module 133 communicates with the various components of the vehicle 102, such as, but not limited to, the propulsion system 110, the transmission system 112, the steering system 114, and the brake system 116.

Figure 2:
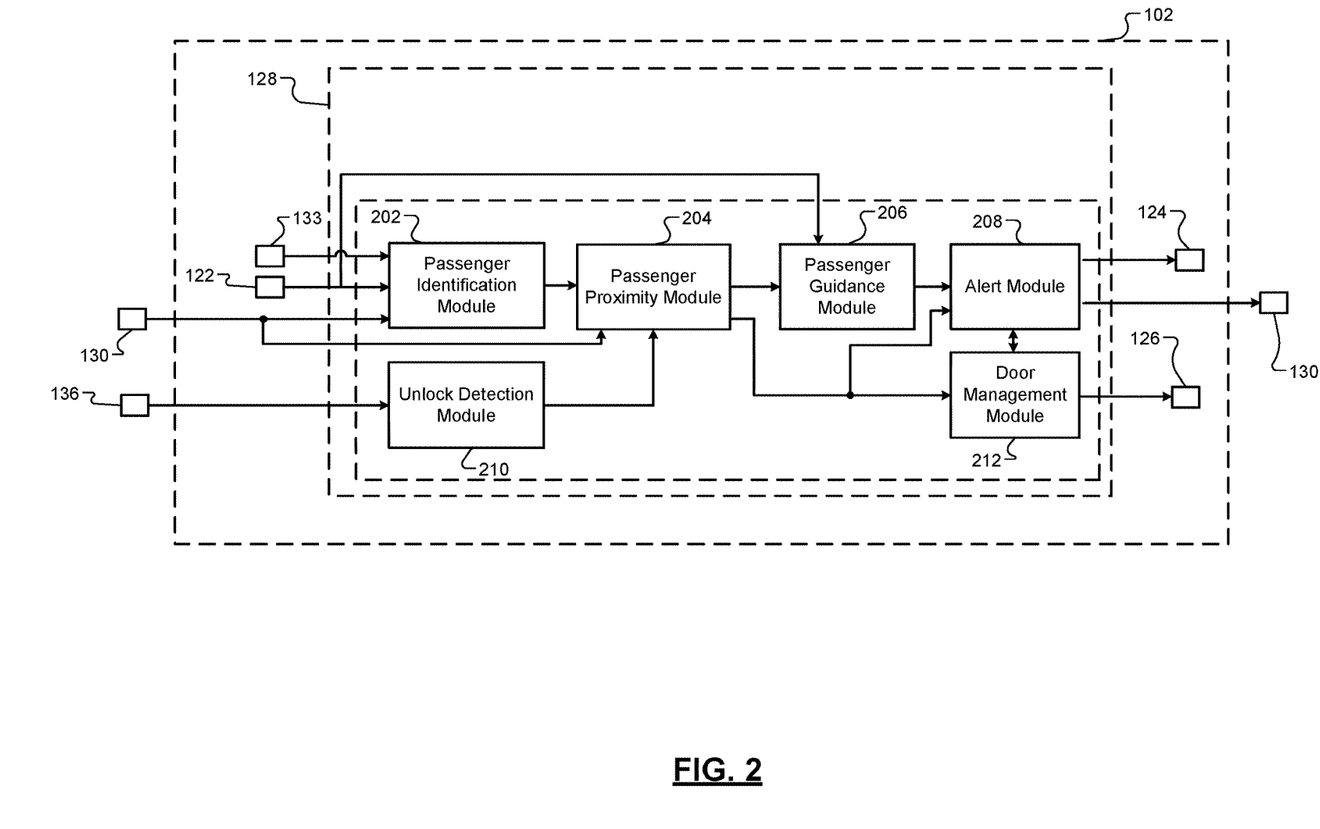
FIG. 2 is a diagrammatic illustration of a passenger management module in accordance with an example implementation of the present disclosure.

FIG. 2 illustrates an example passenger management module 128 in accordance with an example implementation of the present disclosure. As shown, the passenger management module 128 includes a passenger identification module 202, a passenger proximity module 204, a passenger guidance module 206, an alert module 208, a vehicle unlock detection module 210, and a door management module 212.

The passenger identification module 202 receives sensor data from the sensors 122 indicative of the environment proximate to the vehicle 102 and/or data from the mobile electronic device 130. With respect to the mobile electronic device 130, the passenger identification module 202 receives positional data and/or sensor data. The sensor data may represent a gait of the passenger or the like.

The passenger identification module 202 identifies the passenger based upon the received sensor data. In an implementation, the passenger identification module 202 can apply sensor fusion techniques to the sensor data and/or the positional data to identify the passenger external to the vehicle 102. The passenger identification module 202 identifies the passenger with respect to the vehicle 102 based upon sensor data indicative of the passenger and/or the positional data corresponding to the mobile electronic device 130. For example, the passenger identification module 202 identifies the passenger by comparing the positional data of the mobile electronic device with sensor data that corresponds to the positional data. The passenger identification module 202 outputs data indicative of the identified passenger external to the vehicle 102.

The passenger proximity module 204 receives the identified passenger data from the passenger identification module 202. The passenger proximity module 204 determines the position of the passenger with respect to the vehicle 102. For example, the passenger proximity module 204 receives positional data indicative of the vehicle 102 position and compares the vehicle positional data to the passenger positional data. Over multiple time intervals, the passenger proximity module 204 can determine a direction of travel of the passenger with respect to the vehicle 102. For example, the passenger proximity module 204 compares positional data from a prior time interval to positional data for a current time interval to determine the direction of travel with respect to the vehicle 102. The passenger proximity module 204 outputs data indicative of the distance between the vehicle 102 and the passenger and a direction of travel.

The passenger guidance module 206 receives data output from the passenger proximity module 204 to determine an alert characteristic to output based upon the received data. In an implementation, the passenger guidance module 206 compares the data representing the distance with a predetermined distance threshold over multiple time periods to determine the alert characteristic. The alert characteristic indicates an approximate distance between the passenger and the vehicle 102. For example, the passenger guidance module 206 determines that an alert having a first alert characteristic is to be output when the distance is greater than the predetermined distance threshold and that an alert having a second alert characteristic is to be output when the distance is less than the predetermined distance. It is understood that the alerts may include audible alerts, haptic alerts, or the like.

In some implementations, if the passenger is determined to be traveling away from the vehicle 102, the alert may comprise an audible directional command. The audible directional command can indicate that the passenger is traveling in the wrong direction and/or which direction the passenger should be traveling to reach the vehicle 102. For example, if the passenger exceeds a predetermined distance threshold, the passenger guidance module 206 determines that an audible command is to be generated indicating the passenger is traveling in the wrong direction.

The alert module 208 receives data from the passenger guidance module 206. The alert module 208 generates the alert based upon the data provided by the passenger guidance module 206. For example, the alert module 208 can generate an alert having the alert characteristic based upon the data from the passenger guidance module 206. In an implementation, the alert module 208 transmits alerts that have an increasing alert frequency as the distance between the passenger and the vehicle 102 decreases and a decreasing alert frequency as the distance between the passenger and the vehicle 102 increases. The alert characteristic may comprise a frequency characteristic, a pulse duration characteristic, a pulse separation characteristic, or the like.

In another implementation, the alert module 208 transmits alerts that have an increasing pulse duration as the distance between the passenger and the vehicle 102 decreases and a decreasing pulse frequency as the distance between the passenger and the vehicle 102 increases. In yet another implementation, the alert module 208 transmits alerts that have a decreasing pulse separation as the distance between the passenger and the vehicle 102 decreases and an increasing pulse separation as the distance between the passenger and the vehicle 102 increases.

The alert is transmitted to the mobile electronic device 130 via the communication network 132. The mobile electronic device 130 generates an alert according to the alert characteristic. The alert module 208 can modify the alert characteristic as the passenger moves closer to or further away from the vehicle 102.

The passenger management module 128 also generates alerts to allow passengers to locate door handles 126 of the vehicle. As shown in FIG. 2, the passenger management module 128 includes an unlock detection module 210. The unlock detection module 210 receives unlock signals from a vehicle unlock device 136, such as a key fob or the like. The unlock detection module 210 provides an unlock detection signal to the passenger proximity module 204. The passenger proximity module 204 then monitors for a signal from the mobile electronic device 130 indicating the mobile electronic device 130 is within a predetermined distance of the vehicle 102.

In some implementations, the passenger proximity module 204 receives a signal from the mobile electronic device 130 when the mobile electronic device 130 is within the predetermined distance of the vehicle 102. The passenger proximity module 204 generates data indicating the passenger is proximate to the vehicle 102 and provides the data to the passenger guidance module 206.

The passenger guidance module 206 receives the data from the passenger proximity module 204 and sensor data from the sensors 122. For example, the passenger guidance module 206 receives sensor data from the sensors 122 associated with the vehicle seats 134. The sensor data may be pressure data indicative of whether the corresponding vehicle seat 134 is occupied. The passenger guidance module 206 determines whether one of the vehicle seats 134 is not occupied based upon the sensor data and provides an alert indicating which seats are not occupied.

The alert module 208 receives the data indicating which seats are not occupied. The alert module also receives data from the passenger proximity module 204 indicating which door handle 126 the passenger is closest in distance. The alert module 208 generates an alert and transmits the alert to the door handle device 124 corresponding to the vehicle seat 134 that is not occupied. When there are multiple occupancies within the vehicle 102, the alert module 208 transmits the alert to the door handle device 124 determined to be closet in distance to the passenger.

The door management module 212 provides unlock and/or lock signals to cause the door handles 126 to lock and/or unlock when the passenger proximity module 204 provides data indicating the passenger is within a predetermined distance to the door handle 126. Once the passenger has entered the vehicle 102, the door management module 212 provides data to the alert module 208 to cause the alert module 208 to terminate the alerts.

Figure 3:
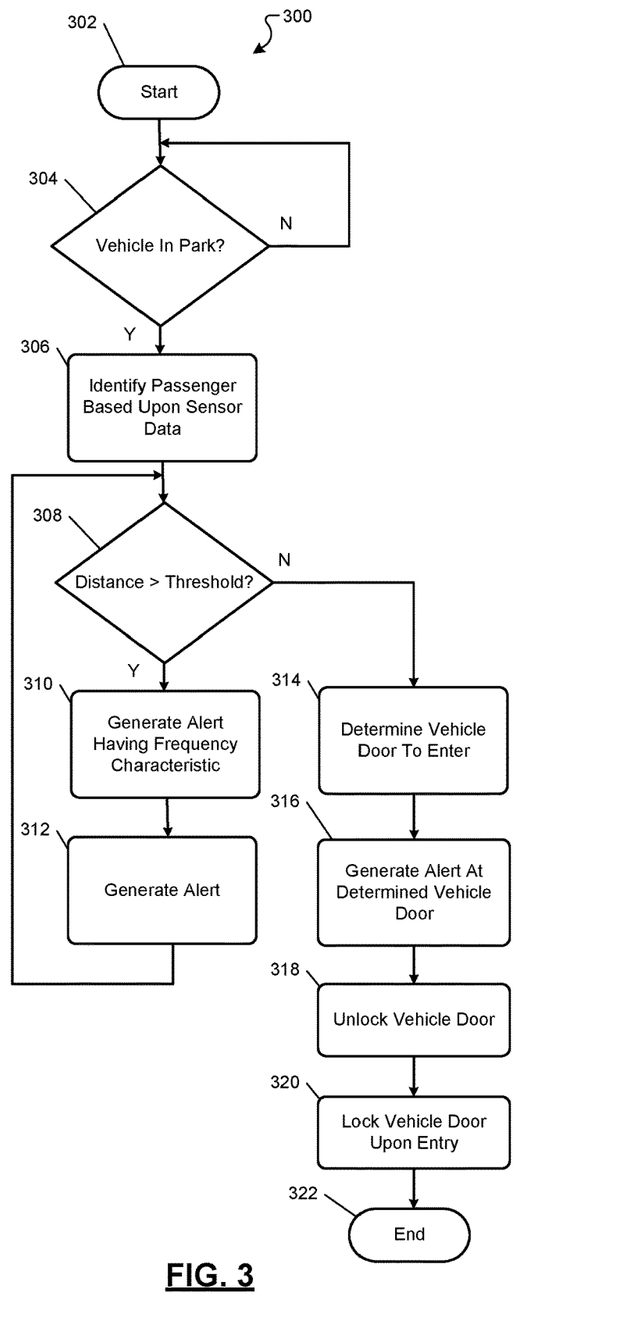
FIG. 3 is a flow diagram illustrating a method for guiding a passenger to the vehicle in accordance with an example implementation of the present disclosure.

FIG. 3 illustrates an example method 300 for guiding a passenger to the vehicle 102. The method 300 is described in the context of the modules included in the example implementation of the passenger management module 128 shown in FIG. 2. However, the particular modules that perform the steps of the method may be different than those mentioned below and/or the method may be implemented apart from the modules of FIG. 2.

The method begins at 302. At 304, the passenger identification module 202 determines whether the vehicle 102 is in park. For example, the passenger identification module 202 receives a park signal from the engine control module 133. If the vehicle 102 is not in park, the method 300 returns to 304. If the vehicle 102 is in park, the passenger identification module 202 identifies the passenger based upon sensor data received from the sensor system 118 at 306.

At 308, the passenger proximity module 204 determines whether a distance between the passenger and the vehicle 102 exceeds a predetermined distance threshold. If the distance exceeds the predetermined distance, the passenger guidance module 206 indicates to the alert module 208 to generate an alert having an alert characteristic at 310. At 312, the alert is generated, and the method 300 returns to 308.

If the distance does not exceed the predetermined distance, the passenger guidance module 206 determines which door handle 126 the passenger is to enter at 314. Based upon the determination, the passenger guidance module 206 causes the alert module 208 to generate an alert indicative of which door handle 126 the passenger is to enter at 316. For example, the alert module 208 generates the alert having the alert characteristic at the door handle device 124. At 318, the door management module 212 unlocks the door handle 126 when the passenger is within a predetermined door distance threshold. At 320, the door management module 212 locks the door handle 126 once the door handle 126 has been closed. The method 300 ends at 322.

Figure 4:
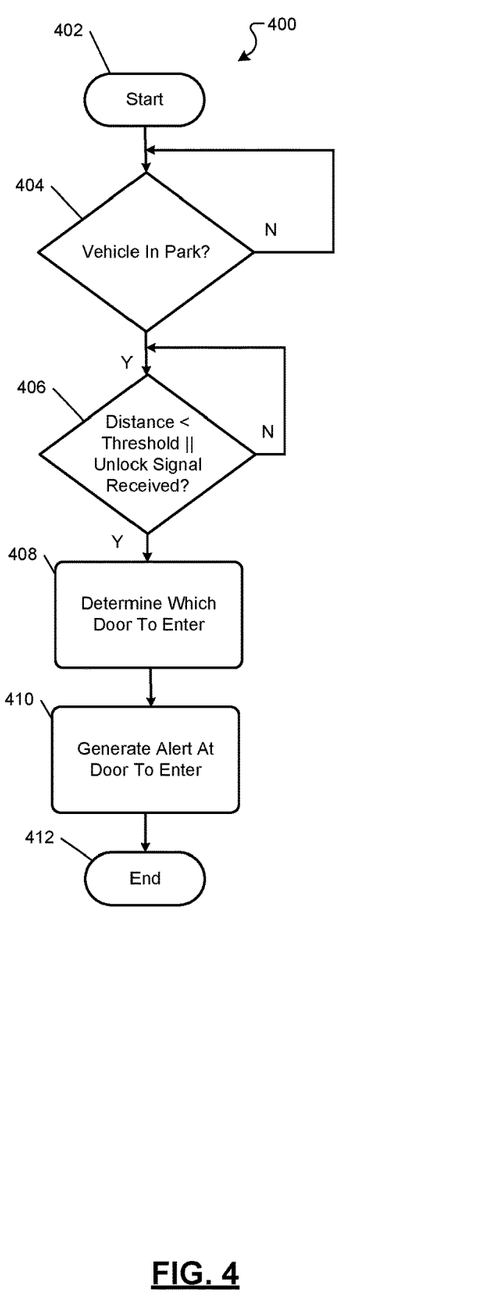
FIG. 4 is a flow diagram illustrating a method for generating an alert at a vehicle door according to proximity of the passenger and/or occupancy of the vehicle in accordance with an example implementation of the present disclosure.

FIG. 4 illustrates an example method 400 for providing alerts to one or more door handles 126. The method 400 is described in the context of the modules included in the example implementation of the passenger management module 128 shown in FIG. 2. However, the particular modules that perform the steps of the method may be different than those mentioned below and/or the method may be implemented apart from the modules of FIG. 2.

The method begins at 402. At 404, the passenger identification module 202 determines whether the vehicle 102 is in park. If the vehicle 102 is in park, the unlock detection module 210 determines whether an unlock signal has been received or whether the passenger is within a predetermined distance of the vehicle 102 at 406. If the unlock signal has not been received or the passenger is not within the predetermined distance, the method 400 returns to 406.

If the unlock signal has been received and/or the passenger is within the predetermined distance, the passenger proximity module 204 determines which vehicle door to enter based upon occupancy or proximity of the passenger to a vehicle door at 408. At 410, the alert module 208 causes the door handle device 124 to generate an alert indicating the vehicle door to enter based upon the determination. The method ends at 412.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
    a passenger identification module that is configured to identify a passenger based upon sensor data received at an autonomous vehicle;
    a passenger proximity module that is configured to determine a distance between the passenger and the autonomous vehicle; and
    an alert module that is configured to generate an alert having an alert characteristic indicative of the distance and a vehicle door to enter based on an occupancy of the autonomous vehicle.

2. The system as recited in claim 1, further comprising a passenger guidance module that is configured to determine whether the distance is greater than a predetermined distance threshold and selects the alert characteristic when the distance is greater than the predetermined distance threshold and selects another alert characteristic when the distance is less than the predetermined distance threshold.

3. The system as recited in claim 1, further comprising a plurality of sensors configured to generate sensor data indicative of an environment surrounding the autonomous vehicle.

4. The system as recited in claim 3, wherein the plurality of sensors comprise at least one of a radar device, a light detection and ranging (LIDAR) device, an optical camera, a thermal camera, an ultrasonic sensor, a pressure sensor, an ultra-wide band (UWB) sensor, and a global positioning system (GPS) receiver.

5. The system as recited in claim 1, wherein the alert module is configured to transmit the alert to a mobile electronic device associated with the passenger.

6. The system as recited in claim 5, wherein the mobile electronic device generates at least one of a haptic feedback and an audible alert based upon the alert.

7. The system as recited in claim 1, wherein the alert module is configured to generate the alert at at least one of a haptic device and an audio device disposed proximate to a vehicle handle of the autonomous vehicle.

8. The system as recited in claim 7, wherein the haptic device generates haptic feedback based upon the alert and the audio device generates an audible alert based upon the alert.

9. The system as recited in claim 7, wherein the alert module is configured to generate the alert at the at least one of the haptic device and the audio device based upon an occupancy of the autonomous vehicle.

10. The system as recited in claim 1, further comprising a door management module that is configured to unlock a door handle when the distance is less than a predetermined distance threshold.

11. A method, comprising:
    identifying a passenger based upon sensor data received at an autonomous vehicle;
    determining a distance between the passenger and the autonomous vehicle; and
    generating an alert having an alert characteristic indicative of the distance and a vehicle door to enter based on an occupancy of the autonomous vehicle.

12. The method as recited in claim 11, further comprising determining whether the distance is greater than a predetermined distance threshold and selecting the alert characteristic when the distance is greater than the predetermined distance threshold and selecting another alert characteristic when the distance is less than the predetermined distance threshold.

13. The method as recited in claim 11, wherein receiving the sensor data further comprises receiving the sensor data from a plurality of sensors configured to generate sensor data indicative of an environment surrounding the autonomous vehicle.

14. The method as recited in claim 13, wherein the plurality of sensors comprise at least one of a radar device, a light detection and ranging (LIDAR) device, an optical camera, a thermal camera, an ultrasonic sensor, a pressure sensor, an ultra-wide band (UWB) sensor, and a global positioning system (GPS) receiver.

15. The method as recited in claim 11, further comprising transmitting the alert to a mobile electronic device associated with the passenger.

16. The method as recited in claim 15, wherein the mobile electronic device generates at least one of a haptic feedback and an audible alert based upon the alert.

17. The method as recited in claim 11, further comprising generating the alert at at least one of a haptic device and an audio device disposed proximate to a vehicle handle of the autonomous vehicle based upon an occupancy of the autonomous vehicle.

18. The method as recited in claim 17, wherein the haptic device generates haptic feedback based upon the alert and the audio device generates an audible alert based upon the alert.

19. The method as recited in claim 11, wherein the alert characteristic comprises at least one of a frequency characteristic, a pulse duration characteristic, a pulse separation characteristic, and an audible command.

20. A system comprising:
   a passenger identification module that is configured to identify a passenger based upon sensor data received at an autonomous vehicle;
   a passenger proximity module that is configured to determine a distance between the passenger and the autonomous vehicle; and
   an alert module that is configured to generate an alert having an alert characteristic corresponding to the distance,
   wherein the alert module is configured to generate the alert at at least one of a haptic device and an audio device disposed proximate to a vehicle handle of the autonomous vehicle based upon an occupancy of the autonomous vehicle.

* * * * *